United States Patent
Shin et al.

(10) Patent No.: US 7,116,488 B2
(45) Date of Patent: Oct. 3, 2006

(54) OPTICAL SYSTEM FOR ZOOM-CAMERA

(75) Inventors: Jeong-Kil Shin, Suwon-si (KR); Byung-Kwon Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/108,970

(22) Filed: Apr. 19, 2005

(65) Prior Publication Data

US 2006/0082898 A1    Apr. 20, 2006

(30) Foreign Application Priority Data

Oct. 20, 2004   (KR)   ...................... 10-2004-0083896

(51) Int. Cl.
*G02B 15/14*   (2006.01)
*G02B 7/02*    (2006.01)
(52) U.S. Cl. ...................... 359/687; 359/822
(58) Field of Classification Search ............... 359/684, 359/687, 129, 193, 362–368, 640, 838, 850, 359/822, 823
See application file for complete search history.

(56) References Cited

U.S. PATENT DOCUMENTS 6,333,823 B1 *  12/2001  Ozaki et al. ................ 359/690
6,498,624 B1 *  12/2002  Ogura et al. ................ 348/335

* cited by examiner

*Primary Examiner*—Scott J. Sugarman
*Assistant Examiner*—M. Hasan
(74) *Attorney, Agent, or Firm*—Cha & Reiter, LLC

(57) ABSTRACT

Disclosed is an optical system of a zoom-camera comprises a plurality of lens groups so that the path of a light can be multi-directionally refracted. The optical system comprises a base member, a first lens group mounted on the base member for refracting a light reflected and incident from an object to a first direction, a second lens group for effecting a zoom function, a third lens group for refracting the light passing through the second lens group to a second direction, a fourth lens group for effecting a zoom function as well as a focusing function while compensating a variation of an image plane caused by the zoom function, and power transmission means for transmitting power for sliding the second and fourth lens groups.

22 Claims, 10 Drawing Sheets

OPTICAL SYSTEM FOR ZOOM-CAMERA

CLAIM OF PRIORITY

This application claims priority to that patent application entitled "Optical System for Zoom-Camera" filed with the Korean Intellectual Property Office on Oct. 20, 2004 and assigned Ser. No. 2004-83896, the contents of which are hereby incorporated by reference.

BACKGROUND OF THE INVENTION

1. Field of the Invention

The present invention relates to an optical cameras and more particularly to an optical system of a zoom-camera in which a plural lens groups are arranged such that a path of light can be multi-directionally refracted in the zoom-camera.

2. Description of the Related Art

Typically, a camera is an optical apparatus for taking a photograph and is also referred to as a photographic machine. Beyond ordinary photographs, news photographs, commercial photographs, building photographs, microphotographs, aerial photographs, and astronomical photographs are widely used in various fields such as medical, industrial, scientific application, etc.

Cameras, as referred to herein, are classified as an ordinary camera which employs a film or more recently, a digital camera which does not require film.

An ordinary camera module is a device for receiving light to render an image to be formed on a film, wherein the camera module comprises a lens group for receiving and rendering light reflected from an object to be focused on a surface of a film, an iris for controlling the intensity of light incident into the camera module through the lens group, a focusing device for adjusting the distance between a lens and the film surface so that the image of the object can be clearly formed on the film surface, a film feeder for feeding films at a predetermined interval, and a shutter assembly for adjusting the length of time for exposing the film to the light.

The digital camera is similar to the ordinary camera module in construction. However, the digital camera is capable of storing a photographed image in an internal memory device (a hard disc or a memory card) instead of a film and the digital camera is capable of inputting a digital image into an external computer.

Here, the most significant component in each of the cameras is a lens. A simple camera may employ a convex meniscus lens or a plastic lens. However, most cameras employ two three or more lens groups. When such camera lens groups are employed in a camera, it is also possible to render magnifying power, thereby implementing a zoom function. In this case, the focal distance of a lens is made variable.

Zoom lenses known in the art are typically configured in a two-group type of positive and negative and a three-group type of positive, positive and negative, or negative, positive and negative.

The two-group type zoom lens implements the zoom function by adjusting the interval between the two lens groups, in which an optical tube and a driving device are simplified because the driving device can be provided by a minimum number of components.

Because the movement of each component group, accompanied at the time of zooming, is increased, the variation of aberration is further increased. Hence, it is known in the art that the two-group type zoom lens is not suitable for a high magnifying power.

The three-group type zoom lens is arranged in such a manner that the movement of each lens group, at the time of zooming, is limited and the variation of aberration can be well corrected. Hence, the three-group type zoom lens is suitable for a high magnifying power. However, there is a disadvantage in the three-group type zoom lens in that because an optical tube and a driving device are complicated and large in size due to the increased number of the lens groups. Hence, the size of a final product is increased. Thereby precluding the miniaturization and thinning of the final product.

In addition, as shown in FIGS. 1 and 2, a lens group 1 of the two-group or three-group type usually employs a prism 2 or a mirror 3 to change the path of a light 4 ninety degrees so that the light progresses in one direction to form an image in an image sensor 5. Such a zooming method is called an inner focus method.

However, this zooming method has a problem in that because lens groups of each type are arranged in a line to cause the path of light to progress in one direction and a driving device moves the lens groups in this state, the driving device is too large and it is difficult to install the driving device although the zooming method may somewhat miniaturize such a camera module. In addition, there is also a problem in that because a space is additionally required for the driving device, it is difficult to provide those lens groups for a portable terminal or a small-sized camera.

SUMMARY OF THE INVENTION

Accordingly, the present invention has been made to solve the above-mentioned problems occurring in the prior art and provide additional advantages, by providing an optical system of a zoom-camera comprising a plurality of lens groups arranged to be capable of refracting a path of light in multi-directions rather than in a single direction, in which a space is secured for installing driving means for effecting a zoom function and a focusing function, thereby allowing the zoom-camera to be miniaturized and thinned.

Another aspect of the present invention is to provide an optical system of a zoom-camera comprising a plurality of lens groups arranged to be capable of refracting a path of light in multi-directions rather than in a single direction, in which a space is secured for installing driving means for effecting a zoom function and a focusing function, thereby allowing the assembling process of the zoom-camera to be simplified and enhancing the performance of the zoom-camera.

According to an aspect of the present invention, there is provided an optical system of a zoom-camera comprising a base member, a first lens group mounted on the base member for refracting a light reflected and incident from an object to a vertical direction, a second lens group arranged in the path of the light refracted by the first lens group, the second lens group being slid along the path of the light to effect a zoom function, a third lens group for refracting the light passing through the second lens group to a horizontal direction, a fourth lens group arranged in the path of the light refracted by the third lens group, the fourth lens group being slid along the path of the light to effect a zoom function as well as a focusing function while compensating for a variation of an image plane caused by the zoom function, and power transmission means provided at a predetermined position on the base member to transmit a power for sliding the second and fourth lens groups.

According to another aspect of the present invention, there is provided an optical system of a zoom-camera module comprising a base member, a first lens group mounted on the base member for refracting a light reflected and incident from an object to a vertical direction, a second lens group arranged in the path of the light refracted by the first lens group, the second lens group being slid along the path of the light to effect a zoom function, a third lens group for refracting the light passing through the second lens group to a horizontal direction, a zooming cam carrying the first, second and third lens groups, the zooming cam being slid in the horizontal direction on the top surface of the base member and sliding the second lens group in the vertical direction, a first driving motor for providing a driving force to slide the zooming cam in the horizontal direction, a fourth lens group arranged in the path of the light refracted by the third lens group, the fourth lens group being slid along the path of the light to effect a zoom function as well as a focusing function while compensating a variation of an image plane caused by the zoom function, and a second driving motor located at a predetermined position on the base member to provide a driving force for sliding the fourth lens group along the path of the light.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiments of the present invention will be described with reference to the accompanying drawing. For the purposes of clarity and simplicity, a detailed description of known functions and configurations incorporated herein will be omitted when it may make the subject matter of the present invention unclear.

Figure 1:
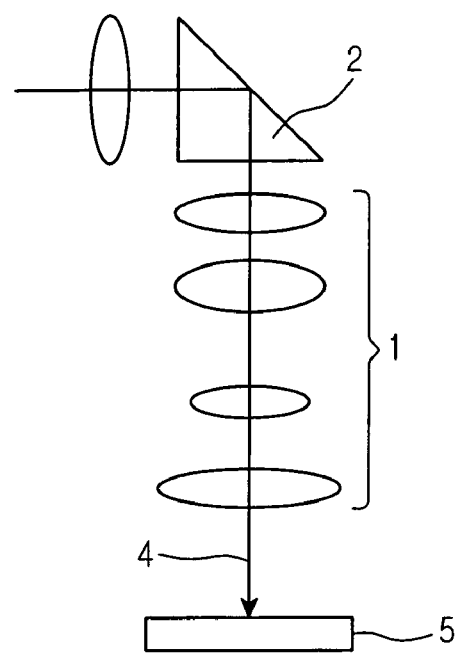
FIG. 1 is a schematic view showing a prism employed in a conventional zoom-camera.
Figure 2:
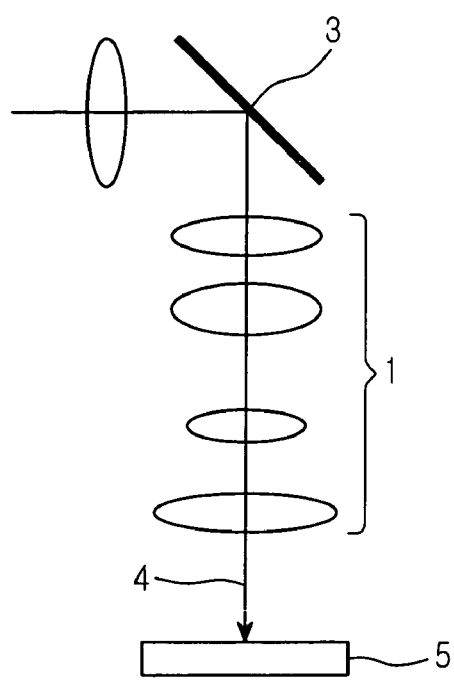
FIG. 2 is a schematic view showing a mirror employed in a conventional zoom-camera.
Figure 3:
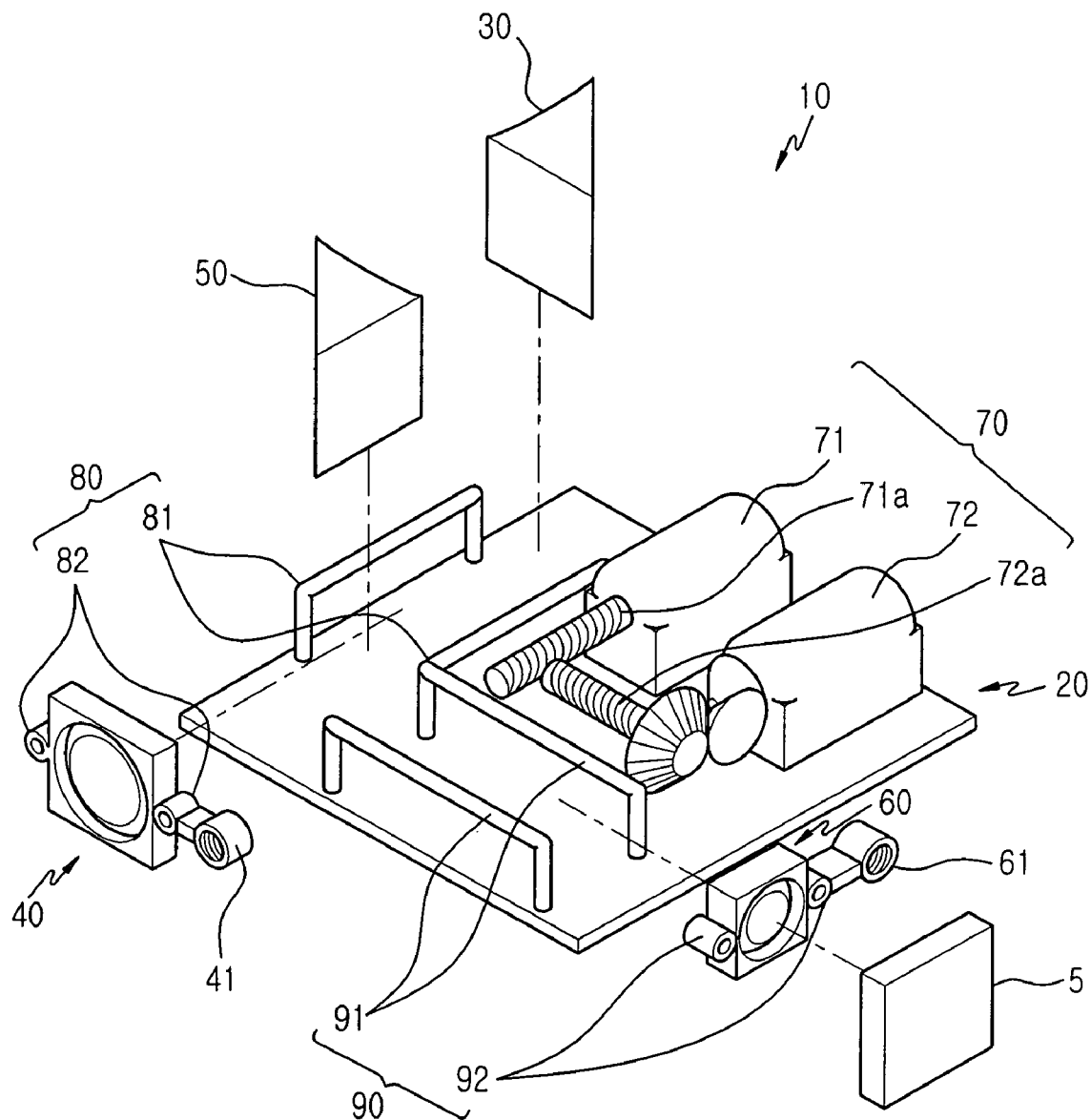
FIG. 3 is an exploded perspective view showing an arrangement of an optical system of a zoom-camera according to a first embodiment of the present invention.
Figure 4:
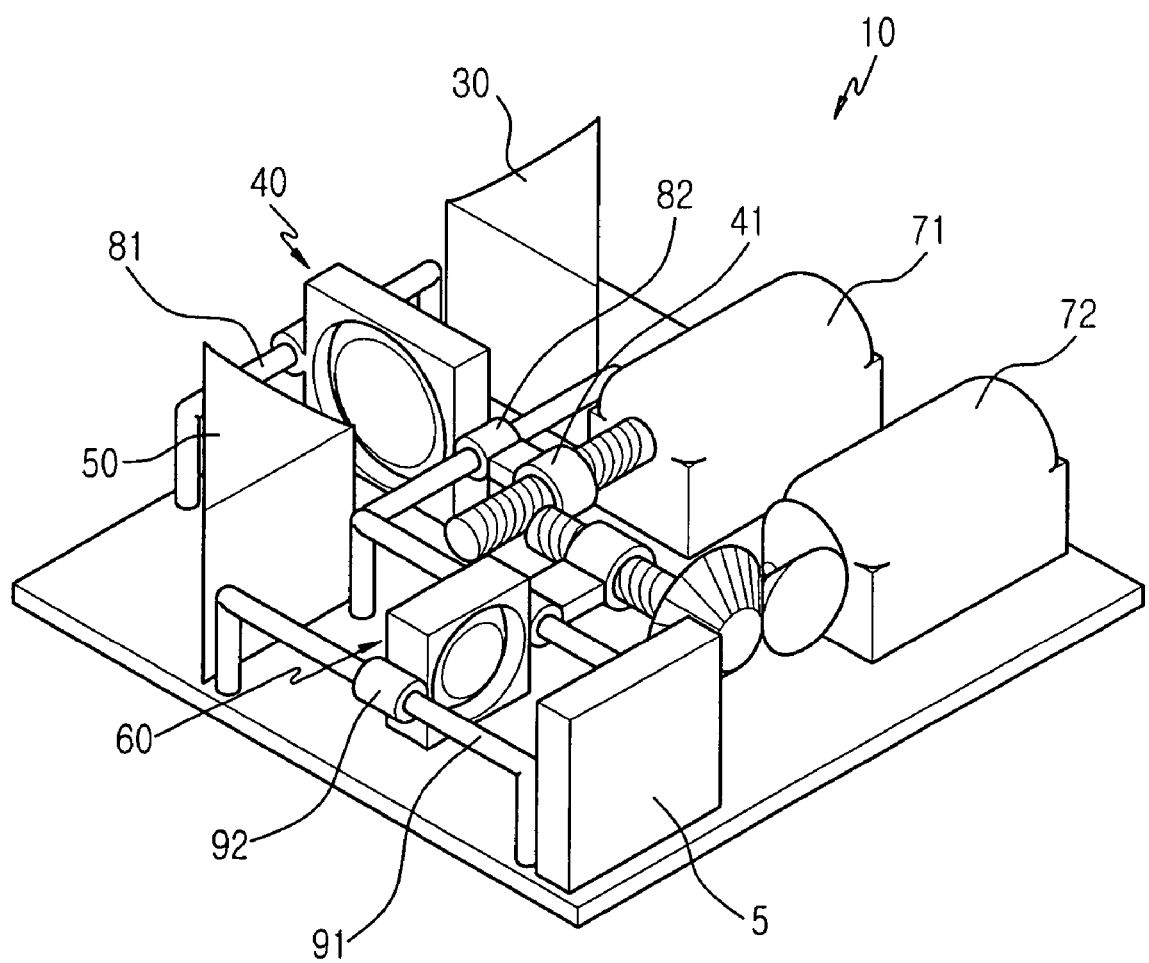
FIG. 4 is a perspective view showing the arrangement of the optical system of the zoom-camera according to the first embodiment of the present invention in an assembled state.

As shown in FIGS. 3 and 4, an optical system 10 of a zoom-camera comprises a base member 20, first to fourth lens groups 30, 40, 50, 60, and power transmission means 70, wherein the base member 20 is adapted to be capable of being equipped with the first to fourth lens groups 30, 40, 50, 60 and the power transmission means 70. The first lens group 30 is provided on the base member 20 so that the first lens group 30 can orthogonally refract a light 4 reflected and incident from an object (not shown). The second lens group 40 is arranged between the first and third lens groups 30, 50 in the path of the light 4 refracted from the first lens group 30, so that the second lens 40 can be slidably moved along the direction of the path of the light 4 to effect a zoom function. The third lens group 50 is arranged at a position neighboring the second lens group 40, so that the third lens group 50 can orthogonally refract the light passing through the second lens group 40. And the fourth lens group 60 is arranged at a position neighboring the third lens group 50 in the path of the light 4 refracted from the third lens group 50, so that the fourth lens group 60 can be slid to effect a zoom function as well as to effect an automatic focusing function while compensating the variation of an image plane caused by the zoom function. The power transmission means 70 is provided at a predetermined position on the base member 20, so that the power transmission means 70 can transmit a power for the sliding movement of the second and fourth lens groups 40, 60.

Figure 5:
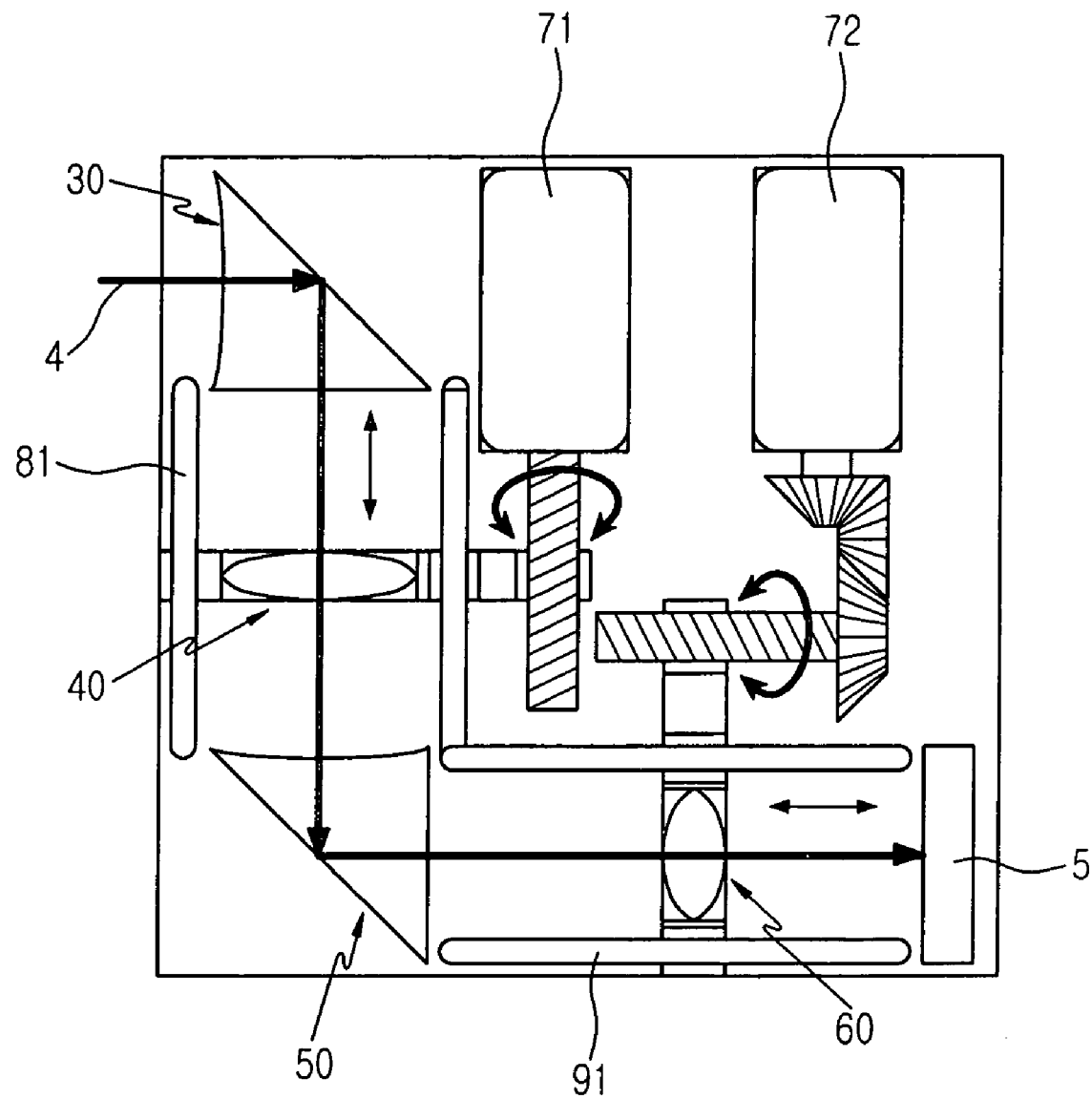
FIG. 5 is a top plan view showing a state in which among various components of the optics of the zoom-camera according to the first embodiment of the present invention, lens groups effect a zoom function and prisms multi-directionally refract the path of light.
Figure 6:
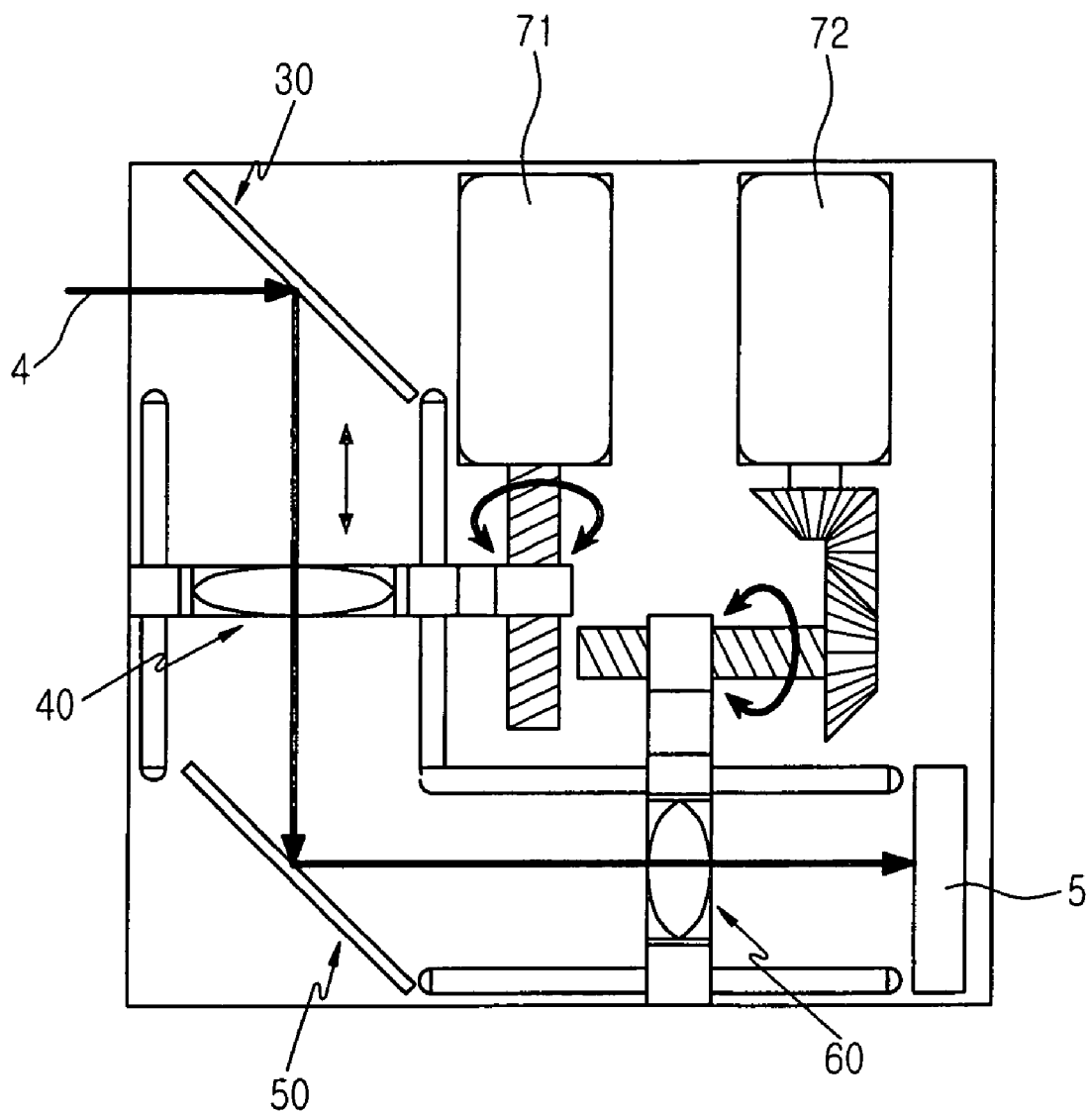
FIG. 6 is a top plan view showing a state in which among various components of the optics of the zoom-camera according to the first embodiment of the present invention, lens groups effect a zoom function and mirrors multi-directionally refract the path of light.

In addition, as shown in FIGS. 5 and 6, each of the first and second lens groups 30, 50 consists of a mirror or a prism which are arranged to be capable of refracting the light 4.

As shown in FIG. 5, the power transmission means 50 comprises first and second driving motors 71, 72, in which the first driving motor 71 is arranged at a predetermined position to be engaged with a first gearing 41 provided in the second lens group 40. In this case, the second lens group 40 can be slid as the first driving motor 71 is driven. Similarly, the second driving motor 72 is arranged at a predetermined position to be engaged with a second gearing 61 provided in the fourth lens group 60 so that the fourth lens group 60 can be slid as the second driving motor 72 is driven.

As shown in FIG. 5, the first gearing 41 is adapted to be meshed with a first motor side gearing 71a provided in the first driving motor 71 and to be linearly moved (which in shown as being in a vertical direction) as the motor 71 is driven, and the second gearing 61 is adapted to be meshed with a second motor side gearing 72a provided in the second driving motor 72 and is linearly moved (which is shown as being in a horizontal direction) as the motor 72 is driven.

In addition, as shown in FIGS. 3 and 5, first and second guide means 80, 90 are provided on the base member 20 to allow the second and fourth lens groups 40, 60 to be moved along the path of the light 4, wherein the first guide means 80 comprises a pair of first guide rails 81 provided on the base member 20 and a pair of first guide parts 82 provided at the opposite sides of the second lens group 40, the first guide parts 82 being slidably engaged with the first guide rails 81, respectively, so that the second lens group 40 can be slidingly guided along the path of the light 4, as the first driving motor 71 is driven.

In addition, as shown in FIG. 5, the second guide means 90 comprises a pair of second guide rails 91 provided on the base member 20 and a pair of second guide parts 92 provided at the opposite sides of the second lens group 60, the second guide parts 92 being slidably engaged with the second guide rails 91, respectively, so that the second lens group 60 can be slidingly guided along the path of the light 4, as the second driving motor 72 is driven.

Now, the operation of the optical system of the zoom-camera according to the first embodiment of the present invention configured as described above will be described in more detail with reference to FIGS. 3 to 6.

As shown in FIGS. 3 and 5, the light 4 reflected and incident from an object is refracted 90 degrees (substantially orthogonally) by the first lens group 30 provided on the base member 20.

At this time, because the second lens group 40 for effecting a zoom function is positioned at a position neighboring the first lens group 30 in the path of the light 4 refracted by the first lens group 30, the second lens group 40 is slid along the path of the light 4 and effects the zoom function.

In addition, because the first driving moor 71 is arranged at a predetermined position on the base member 20 to provide a driving force for sliding the second lens group 20 along the path of the light 4, the second lens group 40 is slid as the first driving motor 71 is driven.

As shown in FIG. 5, the first gearing 41 provided in the second lens group 40 and the first motor side gearing 71a provided in the first driving motor 71 are meshed with each other. Therefore, if the driving motor 71 is driven in this state, the first motor side gearing 71a is rotated and thus the first gearing 41 causes the second lens group 40 to slide in the path of the light 4.

On the base member 20, there is also provided first guide means 80 for allowing the second lens group 40 to be guided in the path of the light 4. Because the first guide means 80 comprises a pair of first guide rails 81 arranged on the base member 20 and a pair of guide parts 82 engaged with the first guide rails 81 to slidingly guide the second lens group 40, the first guide parts 82 of the second lens group 40 are slidingly guided along the first guide rails 81 in the path of the light 4.

In this state, the light 4 passing through the second lens group 40 is refracted 90 degrees (substantially orthogonally) by the third lens group 50 as shown in FIG. 5.

Here, each of the first and third lens groups 30, 50 employs a prism for refracting, substantially orthogonally, the light 4 as shown in FIGS. 3 to 5.

The fourth lens group 60 is positioned neighboring the third lens group 50 in the path of the light 4 refracted by the third lens group 50.

The fourth lens group 60 is slid along the path of the light 4 to effect a zoom function, wherein the fourth lens group 60 also effects an automatic focusing function while compensating for the variation of an image plane caused by the zoom function using a compensator (not shown).

At this time, the light 4 passing through the fourth lens group 60 forms an image in an image sensor 5 as shown in FIG. 5.

The fourth lens group 60 is slid in the path of the light 4 by the second driving motor 72 arranged at a position neighboring the first driving motor 71.

The second driving motor 72 comprises a plurality of bevel gears and a second motor side gearing 72a connected to the bevel gears, and if the second driving motor 72 is driven, the bevel gears are respectively rotated to rotate the second motor side gearing 72a, thereby linearly moving (which is shown as a horizontal direction) the second gearing 61 provided at the fourth lens group.

Meanwhile, second guide means 90 is provided on the base member 20 to make it possible for the fourth lens group 60 to be slid in the path of the light 4.

Because the second guide means 90 comprises a pair of guide rails 91 provided on the base member 20 and a pair of second guide parts 92 respectively engaged with the guide rails 92 to make it possible for the second lens group 60 to be slid, the second guide parts 92 of the fourth lens group 60 are slidingly guided along the guide rails 91 in the path of the light 4.

According to another aspect of the invention, the first and third lens groups 30, 50 are mirrors used for refracting the light 4 as shown in FIG. 6.

The operation of the optical system of the zoom-camera according to the second embodiment of the present invention will be described in more detail with reference to FIGS. 7 to 11.

Figure 7:
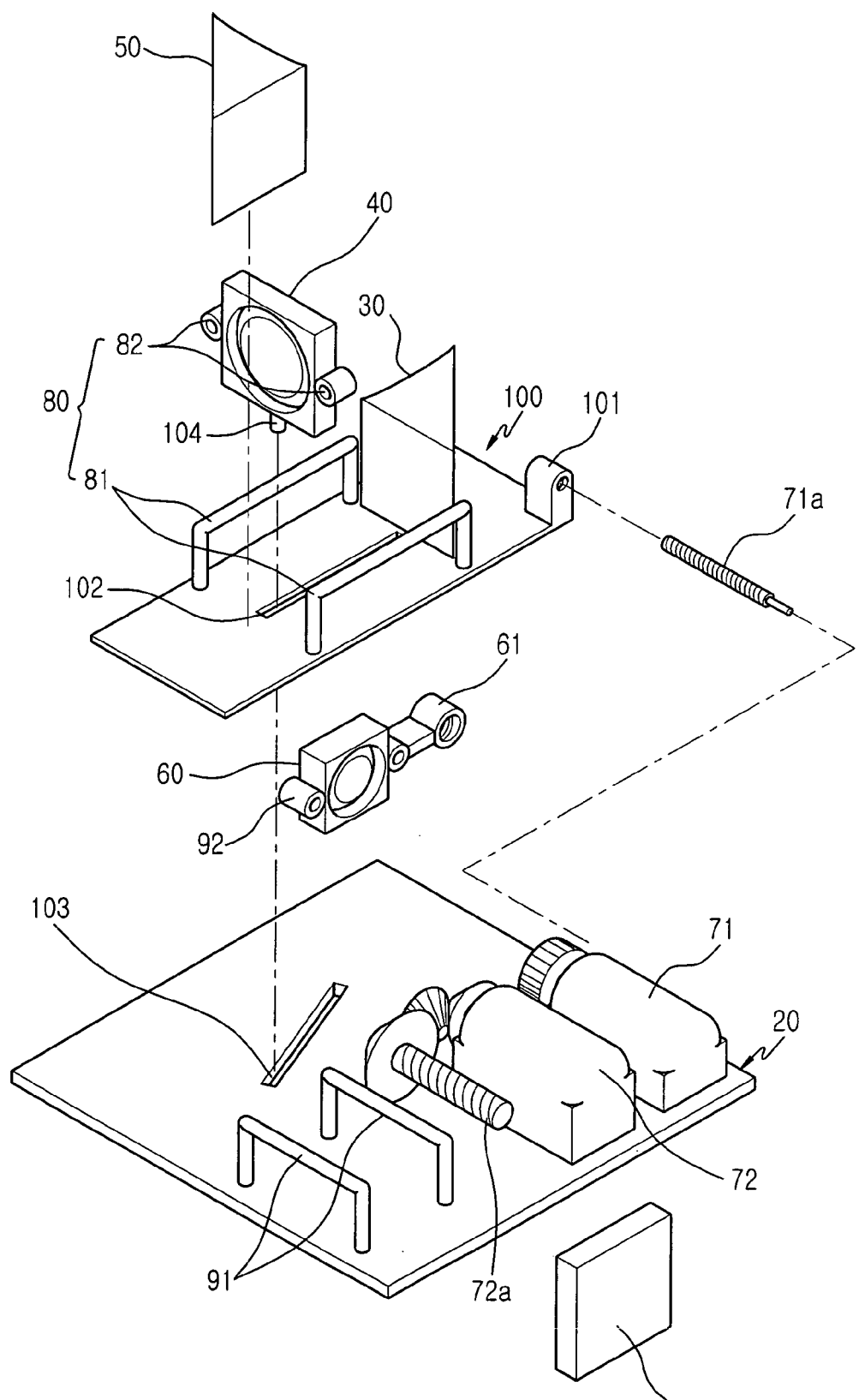
FIG. 7 is an exploded perspective view showing an arrangement of an optical system of a zoom-camera according to a second embodiment of the present invention.
Figure 8:
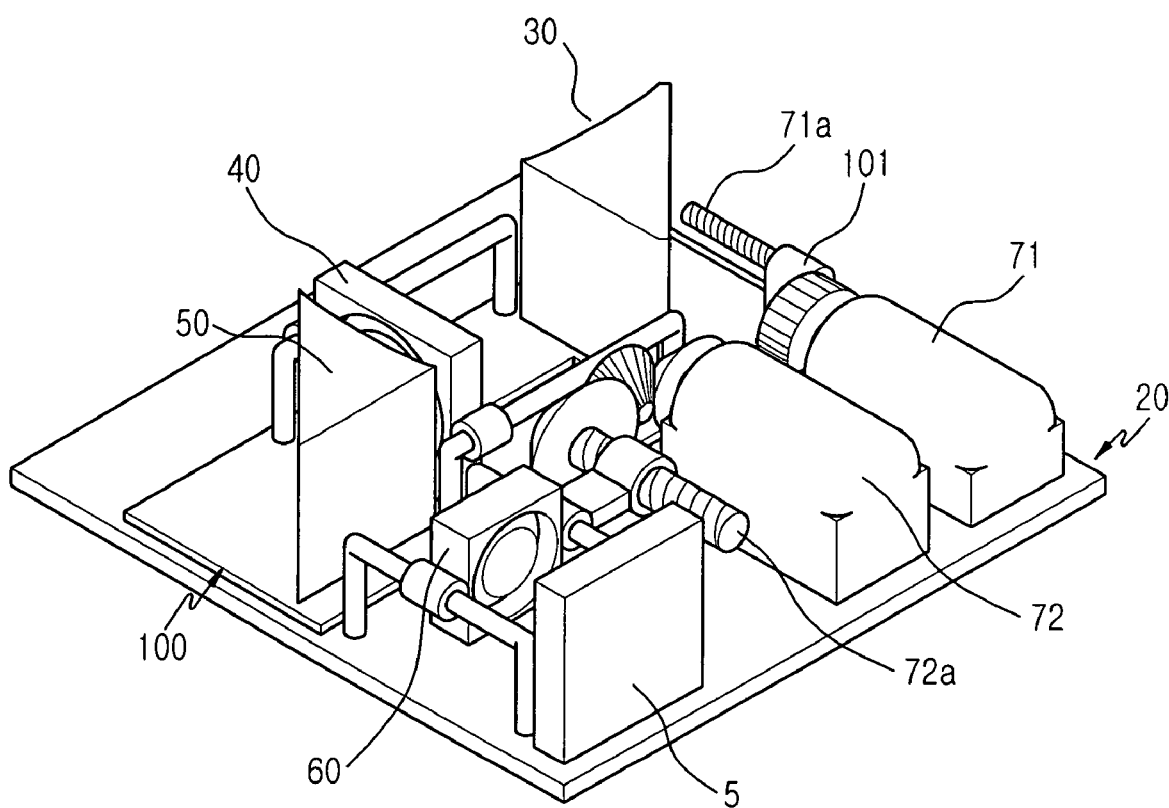
FIG. 8 is a perspective view showing the arrangement of the optical system of the zoom-camera according to the second embodiment of the present invention in an assembled state.

As shown in FIGS. 7 and 8, the base member 20 is provided with a zooming cam 100, which is equipped with first, second and third lens groups 30, 40, and 60.

Figure 9:
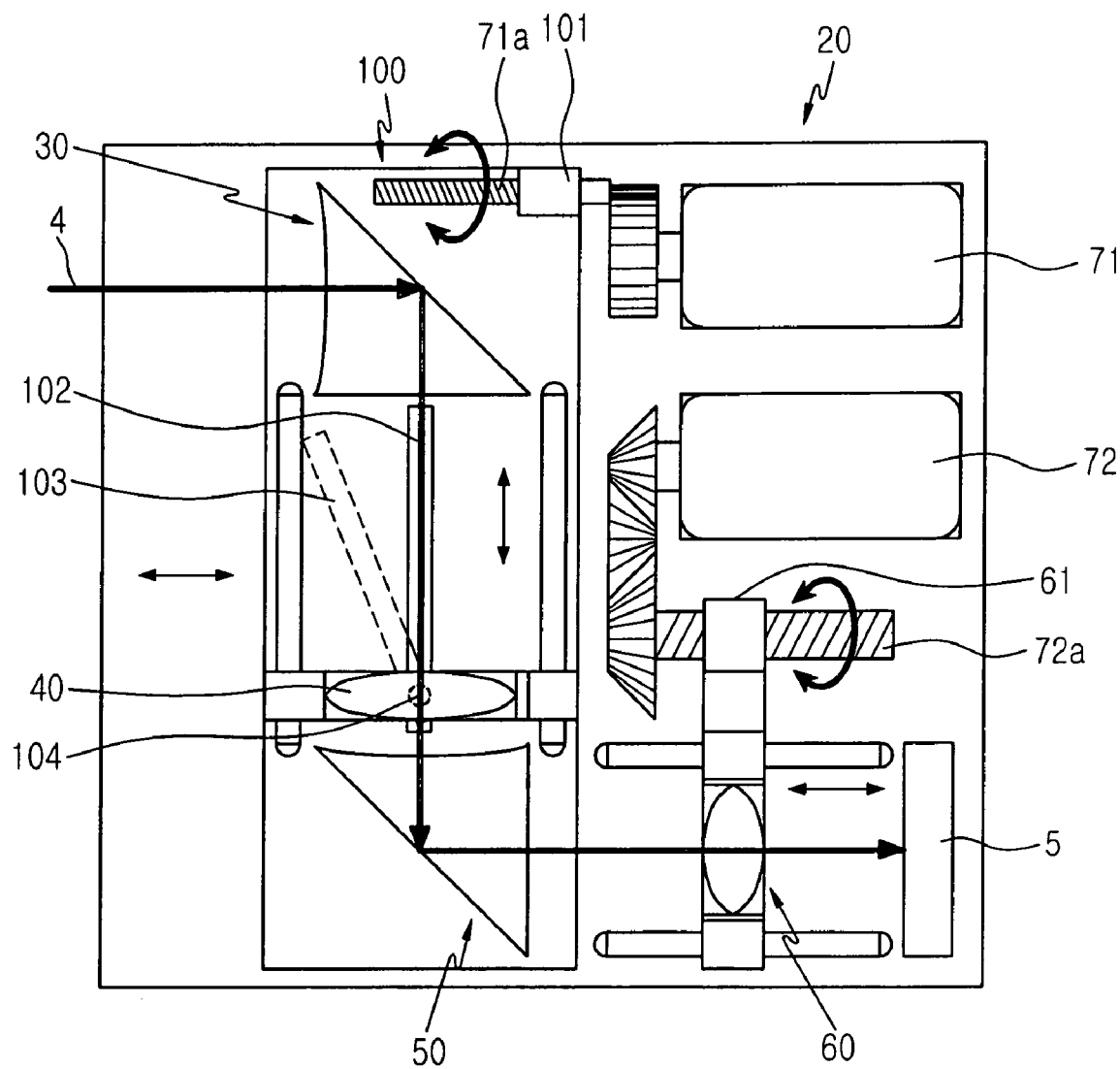
FIG. 9 is a top plan view showing the state before a zooming cam is operated, in which the zooming cam effects a zoom function among various components of the optical systems of the zoom-camera according to the second embodiment of the present invention.

As shown in FIG. 9, the light reflected and incident from an object is refracted 90 degrees to the vertical direction by the first lens group 30 provided in the zooming cam 100.

At this time, because the second lens group 50 is located neighboring the first lens group 30 in the path of the light 4 refracted by the first lens group 30, the second lens group 40 is slid in the path of the light 4 to effect a zoom function.

Meanwhile, a first driving motor 71 is located at a predetermined position on the base member 20 to move the zooming cam 100 in a first direction (shown as a horizontal direction) as well as to move the second lens group 40 in a second direction (shown as a vertical direction) in the path of the light 4. As a result, the second lens group 40 is slid as the first driving motor 71 is driven.

A first gearing 101 is provided at one end of the zooming cam 100 to be engaged with the first motor side gearing 71a connected to the first driving motor 71 and to be linearly moved as the driving motor 71 is driven. Therefore, if the first motor side gearing 71a of the first driving motor 71 is driven, the first gearing 101 is linearly moved, thereby causing the zooming cam 100 to be slid in the same direction.

Figure 10:
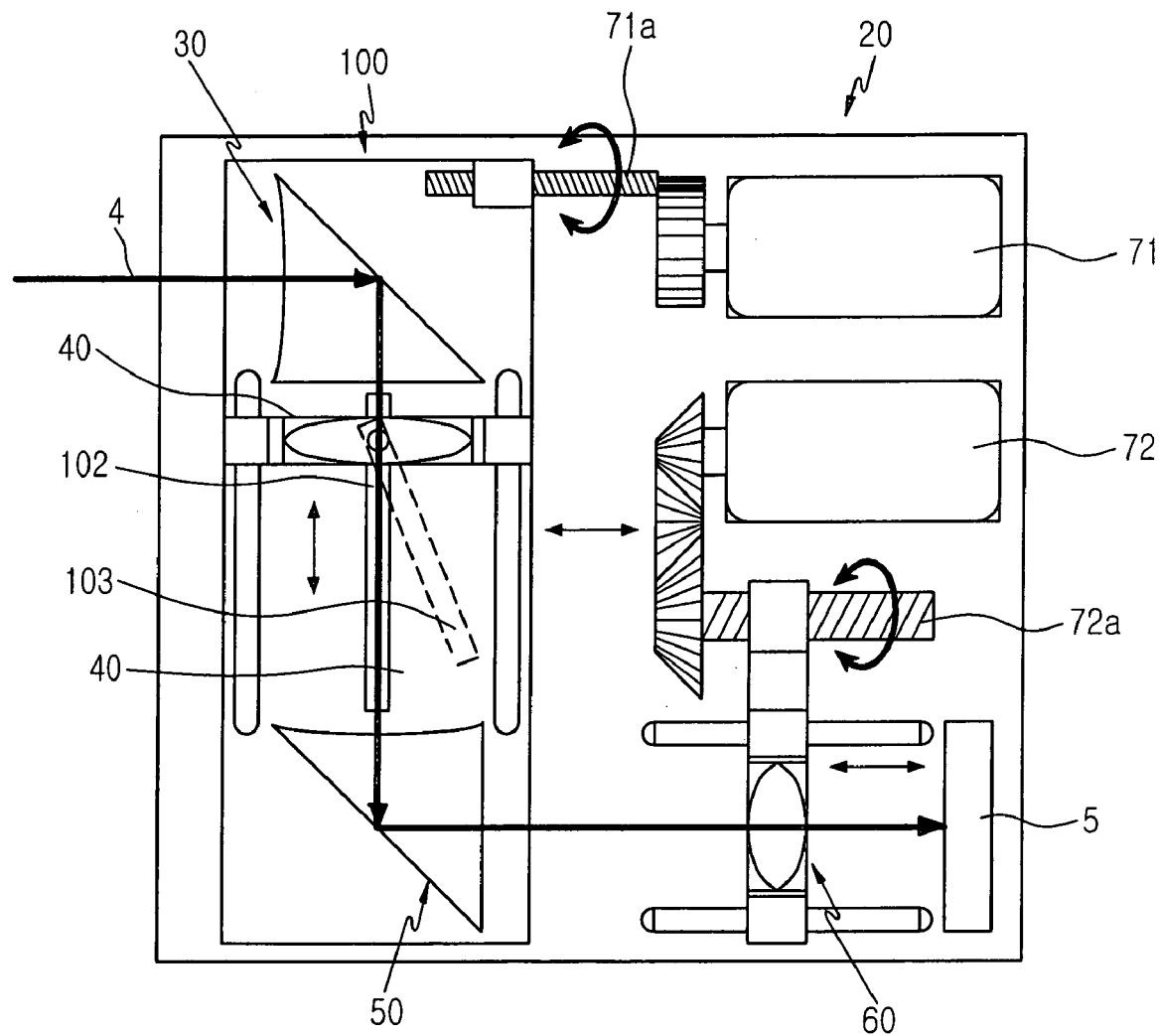
FIG. 10 is a top plan view showing the state before the zooming cam of the optical system of the zoom-camera according to the second embodiment of the present invention has been operated.
Figure 11:
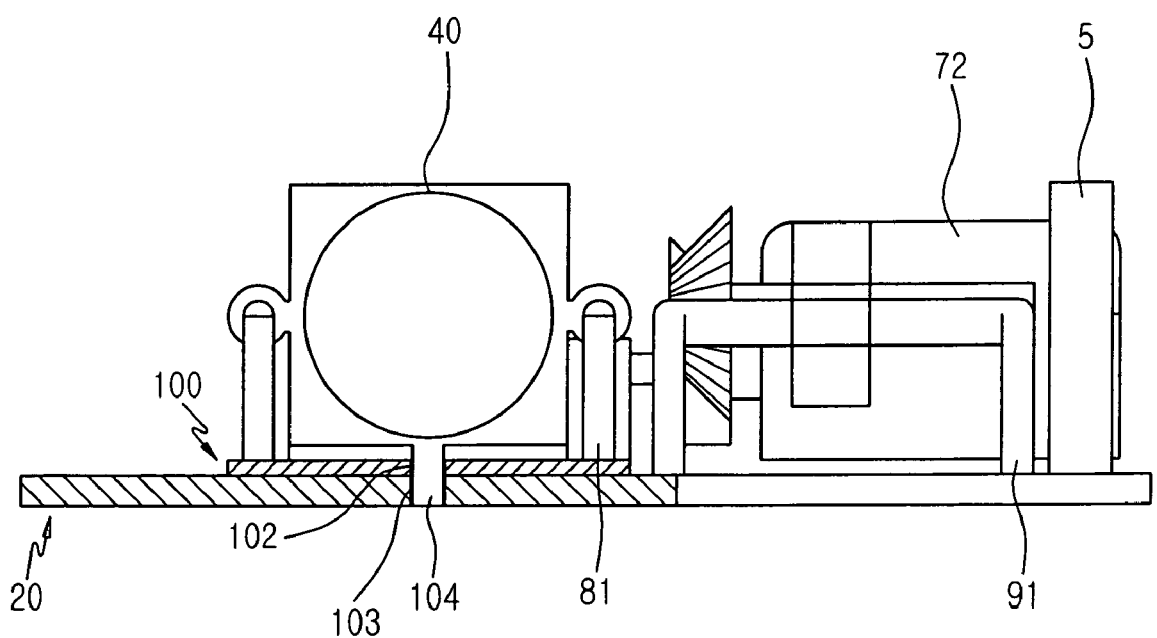
FIG. 11 is a side elevational view showing partially in section the zooming cam of the optical system of the zoom-camera according to the second embodiment of the present invention.

As shown in FIGS. 10 and 11, the zooming cam 100 is formed with a cam hole 102 vertically extending in the longitudinal direction of the zooming cam 100, and a guide projection 104 formed on the bottom of the second lens group 40 is inserted into and engaged with the cam hole 102. In addition, the base member 20 is formed with a guide hole 103 at a position corresponding to the cam hole 102, and the guide projection 104 projected through the cam hole 102 is inserted into and engaged with the guide hole 103.

If the zooming cam 100 is moved in the horizontal direction from the above-mentioned state as shown in FIG. 10, the guide projection 104 is guided in the vertical direction along the cam hole 102 and the guide hole 103 guides the second lens group 40 to be capable of being slid in the vertical direction.

As such, the second lens group 40 is slid in the vertical direction and thus effects a zoom function.

The cam hole 102 is formed to allow the guide projection 104 to be linearly moved in the vertical or longitudinal direction as shown in FIG. 10.

The guide hole 103 is diametrically formed to guide the guide projection 104 of the second lens group 40 and converts the horizontal movement of the zooming cam 100 into the vertical movement of the guide projection 104, thereby allowing the second lens group 100 to be slid in the vertical direction.

The zooming cam 100 is also provided with first guide means 80 to slidingly guide the second lens group 40 in the vertical direction along the path of the light 4.

The first guide means 80 comprises a pair of first guide rails 81 provided on the zooming cam 100 and a pair of guide parts 82 respectively engaged with the first guide rails 81 to slidingly guide the second lens group 40. Therefore, the first guide parts 82 of the second lens group 40 are guided along the first guide rails 81 and slid (as shown in a vertical direction) in the path of the light 4.

In this state, the light 4 passing through the second lens group 40 is refracted 90 degrees (as shown to a horizontal direction) by the third lens group 50.

In this illustrated example, each of the first and third lens groups 30, 50 employs a prism and a mirror for refracting the light 4.

The fourth lens group 60 is arranged in the path of the light refracted by the third lens group 50 at a position neighboring the third lens group 50.

As shown in FIG. 10, the fourth lens group 60 is slid along the path of the light 4 to effect a zoom function, at the time of which the fourth lens group 60 also effects an automatic focusing function while compensating for the variation of an image plane caused by the zoom function with a compensator (not shown).

The light 4 forms an image in the image sensor 5 after passing through the fourth lens group 60.

Meanwhile, the fourth lens group 60 is slid in the horizontal direction along the path of the light 4 by the second driving motor 72 provided at a position neighboring the first driving motor 71.

The second driving motor 72 comprises a plurality of bevel gears and a second motor side gearing 72a connected to the bevel gears, and if the second driving motor 72 is driven, the bevel gears are respectively rotated and thus the second motor side gearing 72a is rotated, thereby linearly moving the second gear part 61 provided in the fourth lens group 60 (as shown in a horizontal direction).

Meanwhile, second guide means 90 is provided on the base member 20 to make it possible for the fourth lens group 60 to be slid in the horizontal direction along the path of the light 4.

Since the second guide means 90 comprises a pair of guide rails 91 provided on the base member 20 and a pair of second guide parts 92 respectively engaged with the guide rails 92 to make it possible for the second lens group 60 to be slid, the second guide parts 92 of the fourth lens group 60 are slidingly guided along the guide rails 91 in (the horizontal direction) in the path of the light 4.

By arranging a plurality of lens groups so that a path of light can be refracted multi-directionally rather than single-directionally in a zoom-camera as described above, a space for installing means for driving the lens groups can be secured, whereby it is possible to miniaturize and thin a product of such a zoom-camera, to enhance the zoom function and focusing function of the camera, and to simplify the process of assembling the components of the camera.

While the invention has been shown and described with reference to certain preferred embodiments thereof, it will be understood by those skilled in the art that various changes in form and details may be made therein without departing from the spirit and scope of the invention as defined by the appended claims. Furthermore, while the invention has been described with regard to a vertical and horizon direction of movement of the second and fourth lens group, it would be recognized that these directional references are used to explain the lens movement with regard to the top views shown and are not meant to describe the physical movement of the lens. Rather the lens movement would be understood to be in a plane substantially parallel to the plane of the base.

What is claimed is:

1. An optical system of a zoom-camera comprising:
   a base member;
   a first lens group mounted on the base member for refracting an image of an object to a first direction;
   a second lens group arranged in the path of the image refracted by the first lens group, the second lens group being slid along the path of the image to effect a zoom function;
   a third lens group for refracting the image passing through the second lens group to a second direction;
   a fourth lens group arranged in the path of the image refracted by the third lens group, the fourth lens group being slid along the path of the image to effect a zoom function as well as a focusing function while compensating for a variation of an image plane caused by the zoom function; and
   power transmission means provided at a predetermined position on the base member to transmit a power for sliding the second and fourth lens groups.

2. An optical system as claimed in claim 1, wherein each of the first and third lens groups is selected from the group consisting of: a mirror and a prism.

3. An optical system as claimed in claim 1, wherein the first, second, third and fourth lens groups are sequentially arranged on the base member along the path of the image refracted.

4. An optical system as claimed in claim 1, wherein a space for receiving the power transmission means is provided on the base member.

5. An optical system as claimed in claim 1, wherein the refracted angle of the image at the first and third lens groups is substantially 90 degrees.

6. An optical system as claimed in claim 1, wherein the power transmission means comprises:
   a first driving motor engaged with a first gearing provided at the second lens group to provide a driving force for sliding the second lens group along the path of the image as the first driving motor is driven; and
   a second driving motor positioned neighboring the first driving motor and engaged with a second gearing provided at the fourth lens group to provide a driving force for sliding the fourth lens group along the path of the image as the second driving motor is driven.

7. An optical system as claimed in claim 6, wherein the first gearing is meshed with a first motor side gearing connected to the first driving motor and linearly moved in the first direction as the first driving motor is driven, and the second gearing is meshed with a second motor side gearing connected to the second driving motor and linearly moved in the second direction as the second driving motor is driven.

8. An optical system as claimed in claim 1, wherein first and second guide means are provided on the base member for guiding the second and fourth lens groups to be slidingly movable along the path of the image.

9. An optical system as claimed in claim 8, wherein the first guide means comprises:
   a pair of first guide rails provided on the base member; and
   a pair of first guide parts provided at opposite sides of the second lens group and engaged with the first guide rails, respectively, to be slidingly movable, the first guide parts guiding the second lens group to be slidingly movable in the path of the image.

10. An optical system as claimed in claim 8, wherein second guide means comprises:
    a pair of second guide rails provided on the base member; and
    a pair of second guide parts provided at opposite sides of the fourth lens group and engaged with the second guide rails, respectively, to be slidingly movable, the second guide parts guiding the fourth lens group to slidingly movable in the path of the image.

11. An optical system of a zoom-camera module comprising:
    a base member;
    a first lens group mounted on the base member for refracting a light reflected and incident from an object to a first direction;
    a second lens group arranged on the way of the path of the light refracted by the first lens group, the second lens group being slid along the path of the light to effect a zoom function;
    a third lens group for refracting the light passing through the second lens group to a second direction;
    a zooming cam carrying the first, second and third lens groups, the zooming cam being slid in the horizontal direction on the top surface of the base member and sliding the second lens group in the vertical direction;
    a first driving motor for providing a driving force so as to slide the zooming cam in the horizontal direction;
    a fourth lens group arranged in the path of the light refracted by the third lens group, the fourth lens group being slid along the path of the light to effect a zoom function as well as a focusing function while compensating for a variation of an image plane caused by the zoom function; and
    a second driving motor located at a predetermined position on the base member to provide a driving force for sliding the fourth lens group along the path of the light.

12. An optical system as claimed in claim 11, wherein each of the first and third lens groups is selected from the group consisting of: a mirror and a prism.

13. An optical system as claimed in claim 11, wherein a space for receiving the first and second driving motors are provided on the base member.

14. An optical system as claimed in claim 11, wherein the refracted angle of the light at the first and third lens groups is substantially 90 degrees.

15. An optical system as claimed in claim 11, wherein a first gearing is provided at an end of the zooming cam meshed with the first motor side gearing, the first gearing being linearly moved as the first motor side gearing is rotated at the time of driving the first driving motor, and a second gearing is provided at the fourth lens group meshed with the second motor side gearing, the second gearing being linearly moved as the second motor side gearing rotated at the time of driving the second driving motor.

16. An optical system as claimed in claim 11, wherein the zooming cam is formed with a cam hole, a guide projection formed on the bottom of the second lens group being inserted and engaged in the cam hole, and the base member is formed with a guide hole at a position corresponding to the cam hole, so that the guide projection projected through the cam hole is engaged in the guide hole, whereby the guide hole guides the guide projection to be slidingly movable in the first direction while the guide projection moves along the cam hole when the zooming cam is moved in the second direction.

17. An optical system as claimed in claim 16, wherein the cam hole longitudinally is formed in the vertical direction, so that the guide projection is linearly movable, and the guide hole is formed in the diametrical direction.

18. An optical system as claimed in claim 11, wherein the zooming cam is provided with a first guide means for guiding the second lens group to be slidingly movable along the path of the light in the vertical direction.

19. An optical system as claimed in claim 18, wherein the first guide means comprises:
    a pair of first guide rails provided on the base member; and
    a pair of first guide parts provided at opposite sides of the second lens group and engaged with the first guide rails, respectively, to be slidingly movable, the first guide parts guiding the second lens group to be slidingly movable in the path of the light.

20. An optical system as claimed in claim 11, the base member is provided with a second guide means for guiding the fourth lens group to be slidingly movable along the path of the light.

21. An optical system as claimed in claim 20, wherein the second guide means comprises:
    a pair of second guide rails provided on the base member; and
    a pair of second guide parts provided at opposite sides of the fourth lens group and engaged with the second guide rails, respectively, to be slidingly movable, the second guide parts guiding the fourth lens group to slidingly movable in the path of the light.

22. An optical system of a zoom-camera module comprising:
    a base member;
    at least one lens group sequentially arranged on the base member to be capable of multi-directionally refracting a light reflected and incident from an object and sliding along the path of the light to effect a zoom function and a focusing function according to the zoom function;
    power transmission means neighboring the lens groups to provide a power for sliding at least one of the lens groups;
    a first gear coupled to the lens group; and
    a second gear coupled to the power transmission means, wherein the first and second gears mesh with one another and cause sliding of the lens group.

* * * * *